May 29, 1951  R. F. GOIK  2,554,619
VEHICLE SPEED MAINTAINING DEVICE
Filed May 1, 1946  2 Sheets-Sheet 1
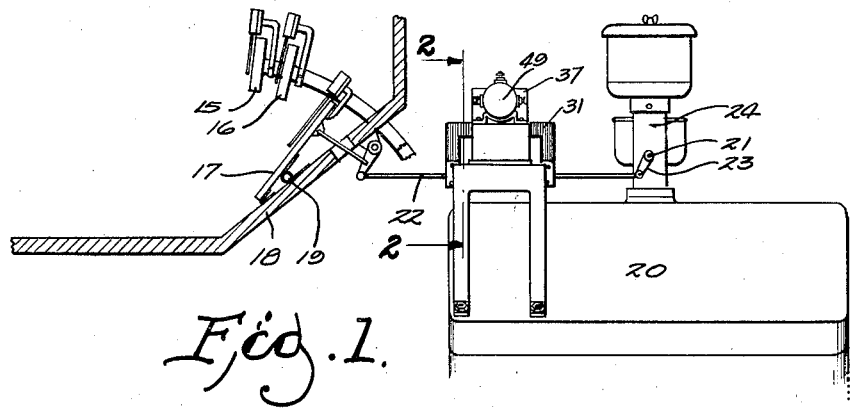
Fig. 1.
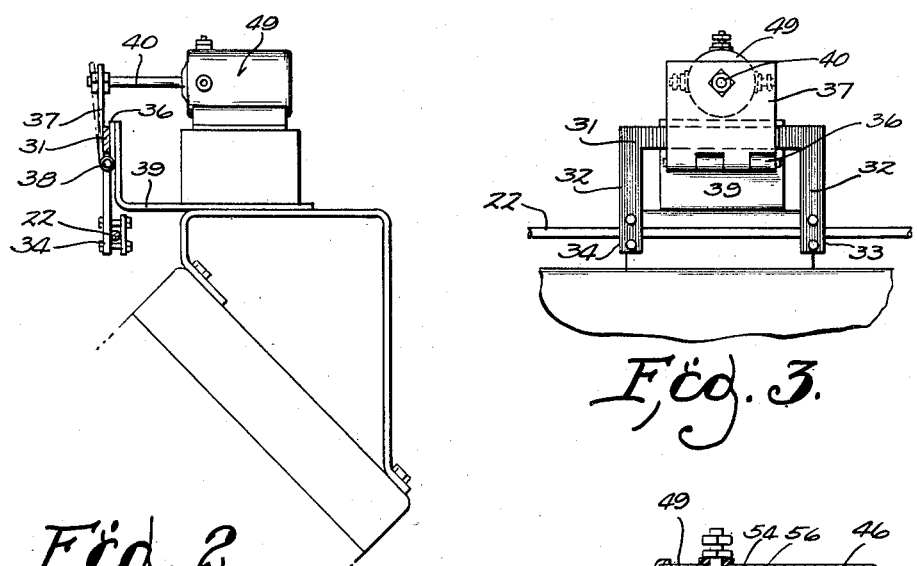
Fig. 2.
Fig. 3.
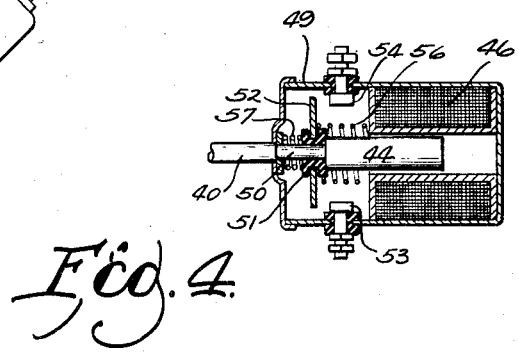
Fig. 4.
INVENTOR
ROMAN F. GOIK
BY Wheeler, Wheeler & Wheeler
ATTORNEYS

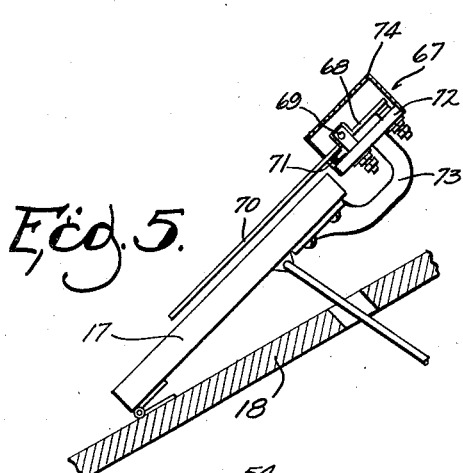
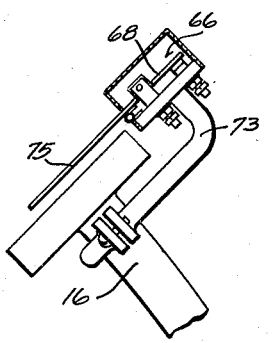
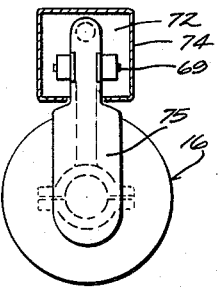
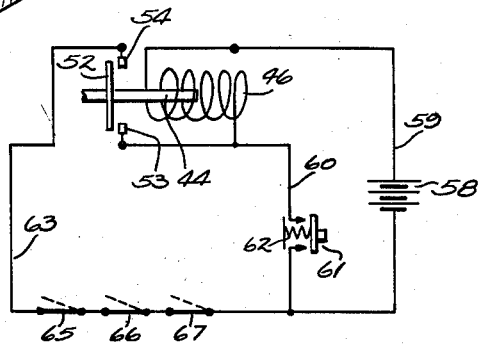
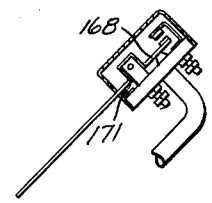
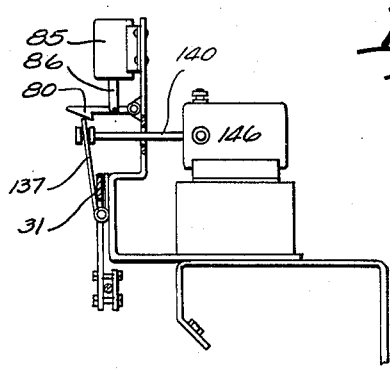
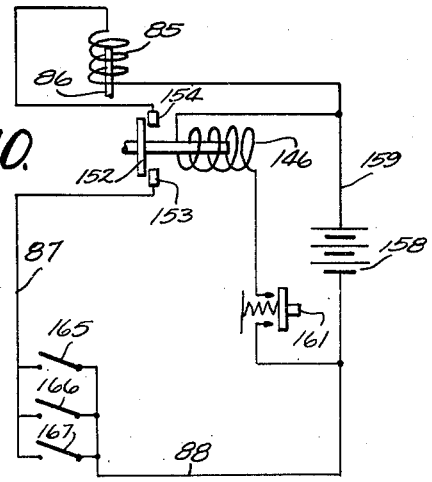

Patented May 29, 1951

2,554,619

UNITED STATES PATENT OFFICE 2,554,619

VEHICLE SPEED MAINTAINING DEVICE

Roman F. Goik, Waukesha, Wis.

Application May 1, 1946, Serial No. 666,491

15 Claims. (Cl. 74—513)

My invention relates to speed maintaining devices for motor driven vehicles.

My object is to provide means whereby the operator of such a vehicle may at all times so predetermine the speed at which he desires to drive over a given stretch of road that it will be unnecessary for him to maintain continuous manual control of the carburetor adjustment.

More particularly stated, it is my object to provide means for temporarily locking the speed regulating means of a motor driven vehicle in a given position of adjustment, subject to instant release by the operator whenever he desires to retard or accelerate the motion of the vehicle. In other words, it is my object to provide means whereby continuous manual control of the speed of the vehicle by the operator will be made unnecessary under substantially uniform load conditions, the operator being thus enabled to remove his foot from the accelerator pedal for long periods of time, subject to instant restoration of normal driving conditions whenever his foot is reapplied to the accelerator pedal, to the brake setting pedal, or to the clutch pedal.

The preferred embodiment of my invention contemplates the use of electrical power to lock the carburetor valve in a given position of adjustment and to unlock it whenever the operator desires to vary that adjustment.

In the embodiment illustrated, the closing of a push button switch temporarily fixes the carburetor adjustment and relieves the driver of the car from the duty of maintaining it, although auxiliary switches associated with the clutch, brake, and accelerator pedals are utilized to instantly release the carburetor for manual readjustment and operation of the vehicle in the same manner in which it would be operated if not equipped with my invention.

Auxiliary hand operated throttle controls have not been satisfactory for several reasons. Their adjustment is apt to change, when subject to road travel vibration, the operator forgets to make needed changes in the adjustment, at times a needed change cannot be made quickly enough, and frequently the adjusting rod sticks in its slideway and can be moved only with great difficulty if at all. With my improved speed maintaining device, these hand controls may be dispensed with.

In the following description reference is had to the accompanying drawings, in which Figure 1 is a conventional illustration in side elevation, of an engine block, carburetor, accelerator pedal and connecting rod to which my invention has been applied, the floor board of the vehicle being shown in section.

Figure 2 is a rear view of the engine and associated parts embodying my invention, the clamping assembly being shown in section, drawn to line 2—2 of Figure 1.

Figure 3 is a detail of the clamping assembly as seen from the side opposite that illustrated in Figure 1, and showing fragments of the accelerator rod and engine block.

Figure 4 is a sectional view of the clamp operating solenoid.

Figure 5 is a detail view of the accelerator pedal switch for breaking the solenoid circuit.

Figure 6 is a detail view of a similar switch as it appears on either a brake or clutch pedal.

Figure 7 is a detail plan view of the switch illustrated in Figure 6, with its housing shown in section.

Figure 8 is a diagram of the solenoid circuits.

Figure 9 is a conventional illustration in side elevation of a modified clamping assembly.

Figure 10 is an electrical diagram of the solenoid circuits of the Figure 9 assembly.

Figure 11 is a detail view of a modified form of pedal switch used with the modified embodiment shown in Figure 9.

Like parts are identified by the same reference characters throughout the several views.

The motor driven vehicle to which my invention is applied may be assumed to be provided with an ordinary clutch pedal 15, brake pedal 16, and accelerator pedal 17 applied to the portion 18 of the floor board of the vehicle and each normally retracted or urged to a raised position by a spring 19 subject to foot power operation. The speed of the engine 20 is controlled by an ordinary speed regulating valve at 21 which regulates the fuel feed and is adjusted during engine operation by pressure on the accelerator pedal 17 transmitted by the operating or accelerator rod 22 to valve crank 23, thereby adjusting the valve 24 to regulate the fuel feed from the carburetor 24. All of these parts may be of any ordinary construction, and therefore require no further illustration or description.

In the illustrated embodiment of my invention, a flat bar 31 has arms 32 which are secured to the accelerator rod 22 at 33 and 34, and electrically operable clamping means are employed to temporarily hold this bar 31 and its associated accelerator rod 22 in a desired speed determining position of adjustment.

For this purpose the bar 31 is positioned between a pair of clamping plates 36 and 37 which are hinged together at 38 underneath the bar. The plate 36 may be supported from the engine block by an elbowed plate or bracket 39. The plate 37 extends to a higher level and is connected by a rod 40 with the core 44 of an electromagnet or solenoid having a winding 46 adapted, when energized, to draw the core 44 to the right in Figure 4, and thus utilize the rod 40 to draw the hinge plate or leaf 37 into clamping relation to the bar 31 and the fixed clamping plate 36, thus locking the bar and the accelerator rod against further movement until the solenoid is deenergized.

Within the solenoid casing 49, a portion 50 of the rod 40 is reduced in diameter and provided with a sliding collar 51 of insulating material which carries a circuit closing disk 52 adapted for bridging contact with terminals 53 and 54 mounted upon the solenoid casing but insulated therefrom. A coiled spring 56 urges this collar 51 and the disk 52 toward circuit breaking position, and on the other side of the collar a coiled cushion spring 57 is employed to limit the movement of the collar 51 in the circuit breaking direction.

The solenoid circuits are diagrammatically illustrated in Figure 8. A primary solenoid energizing circuit of the battery 58 may be manually established through the line 59, the solenoid winding and line 60, and back to the battery when the push button switch 61 is closed. This switch may be located in any convenient position, preferably upon the instrument board of the vehicle. When the driver of the vehicle wishes to utilize my improved speed maintaining device, he momentarily pushes the button 61 to circuit closing position and then releases it, to be returned to circuit breaking position by its actuating spring 62. But, in the meantime, the solenoid will have been energized and the space between the terminals 53 and 54 will have been bridged by the disk 52, thereby closing a holding circuit from the line 59 across the terminals 53 and 54 to line 63 and back to the battery. Line 63 is provided with foot operated switches at 65, 66 and 67, mounted respectively on the clutch, brake and accelerator pedals.

The switches 65, 66 and 67 are substantially alike. In Figure 5 the switch 67 has its movable contact mounted on the arm 68 of a lever fulcrumed at 69 and having an actuating arm 70 overlapping the accelerator pedal 17 in normally spaced relation thereto. A spring 71 urges the lever to circuit closing position, from which it is moved to circuit breaking position by the foot of the operator whenever the latter is applied to the accelerator pedal. The fixed contact member is mounted on an insulating plate 72 connected with the pedal 17 by a bracket 73. A housing 74 protects the switch contacts and the lever fulcrum 69 and has an opening through which the actuating arm 70 extends.

The other switches 65 and 66 are of exactly the same construction except that their actuating arms 75 may be shorter than the actuating arm 70. Therefore the description of these switches and their mountings need not be repeated.

In Figures 9, 10 and 11, I have illustrated a modified form of construction of the clamping assembly, in which the movable hinge leaf 137, corresponding with the movable clamping leaf 37 shown in the other views, may be mechanically locked in clamping position by a latch 80, thus making it unnecessary to have the clamp setting solenoid energized continuously while the leaf 137 is being held in its clamping position.

In this modification, no holding circuit is required but the terminals 153 and 154 are included in the normally open circuit of a latch releasing solenoid 85 having its core connected with the latch by a rod or extended core 86.

When an initial circuit of battery 158 is established by push button 161 through the solenoid 146, it will be momentarily energized to move plate 137 to clamping engagement with bar 31. It will then be automatically locked in this position by latch 80 and the disk 152 will be held in a position bridging the terminals 153 and 154 of an auxiliary normally open circuit from battery 158 through line 159 and latch releasing solenoid 85 and lines 87 and 88. The lines 87 and 88 are connectible by any one of the normally open switches 165, 166 or 167, these switches being arranged in parallel and mounted on the clutch brake and accelerator pedals respectively.

Each of the switches 165, 166 and 167 may be identical in structure with the other two. They may be similar to the above described switches 65, 66 and 67, except that their fixed contacts are located above the movable ones carried by the lower arms 168 of the respective pedal switches, whereby their springs 171 will normally hold these switches in an open or circuit breaking position. But any one of them may be closed to complete the circuit of the latch releasing solenoid whenever the clamp 137 is in holding position. In other words, the closing of any one of these pedal switches under such conditions will energize the solenoid 85, release the latch 80. Solenoid 146 being deenergized, the spring 56 will then push rod 140 to its normal position, thus retracting clamping leaf 137 and releasing the locking bar and the accelerator rod to which it is connected.

The operation of my improved speed maintaining device will be readily understood, but it may be reviewed as follows.

When the driver of the vehicle desires to be relieved of the necessity for keeping his foot constantly on the accelerator pedal in order to keep the vehicle at a desired rate of speed, he pushes the button 61 (or 161) to close an energizing circuit through the clamp actuating solenoid, and while this button is in circuit closing position he removes his foot from the pedal, thus allowing the pedal switch to close. Thereupon the accelerator rod will be locked or clamped in a fixed position, and the speed of the vehicle will be maintained, subject only to varying conditions of load imposed by the road. Whenever the driver applies his foot to either the clutch, brake, or accelerator pedal, the accelerator rod will be released and the vehicle will then be operated in the ordinary manner until the operator again presses the push button 61 (or 161) to circuit closing position. When he does this, the speed at which he is then traveling will continue to be determined by my improved speed maintaining mechanism until he again places his foot on one of the pedals.

From the foregoing description it will be understood that although any means for regulating the delivery of fuel to an internal combustion engine by locking in one position the valve which controls such deliveries subject to instant release of the valve, followed by normal operation of the engine, may be within the scope of my invention, yet an important feature of my invention is in the association of such releasing means with one or more of the foot operated pedals, particularly the accelerator pedal. By mounting a releasing lever on the accelerator pedal in a position where it will be actuated whenever the operator applies his foot to that pedal, normal operation will be restored, regardless of whether or not the operator intends to do so. The same is true of the releasing levers applied to the brake and clutch pedals, or either one of them. A single lever may be used, and if it is desired to require the operator to give the motor his attention in order to release the speed controlling valve, the releasing lever may be located anywhere within reach of the operator. However, the provision of at least one release lever on one of the pedals, is desirable, and the use of such a lever on each pedal is much to be preferred, since normal control of the vehicle is then instantly resumed the moment the operator applies his foot to any one of these pedals.

I claim:

1. The combination with the accelerator rod and pedal of a vehicle driven by an internal combustion engine, of a clamp for temporarily holding said rod in a speed determining position, and an electrical circuit including means for operating said clamp, a normally open manually operable switch for momentarily closing said electrical circuit, a circuit holding relay adapted to hold the circuit established by said switch and a foot operable switch mounted on said pedal to open said circuit when the pedal is actuated.

2. The combination set forth in claim 1, in which said circuit includes a solenoid operably connected with the clamp, and said accelerator rod is provided with a member normally in sliding relation to the clamp and in a position to be gripped thereby when the solenoid is energized.

3. The combination with the speed regulating valve of an internal combustion engine, of an electrically controlled lock for temporarily holding said valve in a fixed position of adjustment, an electrical control for said lock, a foot operable pedal for adjusting said valve when said valve is not held by the said lock, said electrical control including a lock releasing switch mounted on said pedal and having a contact actuator directly operable by the operator's foot and in controlling relation to said lock.

4. In a vehicle equipped with an internal combustion engine and a speed controlling valve for regulating delivery of combustible fluid to the engine, the combination therewith of a valve adjusting rod, a bar connected with said rod, a clamp adapted in one position to hold said bar and rod in a fixed position of adjustment, an electrical circuit provided with a clamp actuating solenoid, a foot operated pedal for actuating said rod, and a switch mounted on said pedal in controlling relation to the circuit of said solenoid.

5. The combination with an internal combustion engine having a pedal operated speed controlling valve, of an electromagnetically controlled lock for holding said valve in a fixed position of adjustment, said electrical control including a foot operated switch mounted on said pedal and having contacts in circuit with said electromagnetically controlled lock, and a contact actuator exposed for direct actuation by a foot operating said pedal for releasing the valve for readjustment.

6. The combination with the accelerator rod and pedal of a motor driven vehicle equipped with an internal combustion engine, of a slide bar fixed to said rod and offset therefrom, a set of relatively movable clamping plates between which said bar is normally mounted for sliding movement, and electromagnetic means for adjusting said clamping plates in gripping relation to the bar, said means including an electrical circuit having a controlling switch mounted on the pedal.

7. In a speed maintaining mechanism for motor driven vehicles having a speed regulating pedal operable independently of said speed maintaining mechanism, an electromagnetic means for rendering the speed maintaining mechanism inoperative, including a lever mounted on a speed regulating pedal.

8. The combination with an internal combustion engine having a speed regulating valve, a foot operated pedal for determining the position of the valve and an operating rod connected between said valve and pedal, a holding device remote from the pedal and engageable with the rod for temporarily fixing the position of the pedal, and a releasing lever operatively connected with the holding device and mounted on the pedal in a position for operation when pressure is applied to the pedal to operate the latter.

9. The combination with the accelerator rod of an internal combustion engine for driving a motor vehicle, of an offset bar secured to the rod in a parallel position, a clamp, a solenoid for adjusting said clamp to engagement with the bar, a manually controlled electric circuit for energizing said solenoid, means operable by the solenoid for locking said clamp in clamping position, and a remotely operable means for releasing said locking means and clamp.

10. The combination set forth in claim 9, in which the locking means comprises a pivoted latch engageable with the clamp and the remotely operable means comprises a solenoid adapted, when energized, to release the latch.

11. The combination with the accelerator pedal of an automobile driven by an internal combustion engine and having a rod connected with one of the engine valves, of clamping means engageable with the rod for temporarily fixing the position of said rod, and a lever on the accelerator pedal operatively connected to release the clamping means when pressure is applied to said lever and pedal.

12. The combination set forth in claim 11, in which said operative connection between said lever and clamping means includes an electrical circuit having a fixed terminal associated with said lever and a movable terminal mounted thereon in position for contact with the fixed terminal in one position of the lever.

13. In a speed maintaining mechanism of the described class, the combination with a clamp for locking the maintaining mechanism in various positions of adjustment, a solenoid for operating the clamp to locking position, a latch for holding the clamp in locking position, an auxiliary solenoid for releasing the latch, hand controlled means for energizing the first mentioned solenoid, and foot controlled means for energizing the last mentioned solenoid.

14. In a vehicle having an accelerator pedal having throttle connections, the combination therewith of an adjustment locking means for said connections and an electrical control for said locking means and including in operative circuit connection a switch mounted on the pedal and provided with contacts and with a contact actuator positioned to be operated by a foot actuating the pedal, a manually operable switch for engaging said locking means, and an electromagnet controlled by said foot operated switch for releasing said locking means.

15. In a vehicle having a plurality of pedals required for its control, one of said pedals comprising an accelerator pedal having a throttle valve operating rod, the combination therewith of a clamp for fastening said operating rod in a selected position, an electromagnet having an armature connected with said clamp for the engagement thereof with said operating rod, a switch in operative circuit connection with said electromagnet, and a clamp releasing circuit comprising switches mounted upon the respective pedals and conductors connecting said switches in series, each of said switches comprising a contact actuator positioned to be engaged directly by a foot operating the respective pedal, whereby the act of actuating any of said pedals will effect the release of said clamp.

ROMAN F. GOIK.

REFERENCES CITED

The following references are of record in the file of this patent:

UNITED STATES PATENTS

| Number | Name | Date |
|---|---|---|
| 1,316,727 | Koressios | Sept. 23, 1919 |
| 1,436,154 | Dickerson | Nov. 21, 1922 |
| 1,830,441 | Mulhollen | Nov. 3, 1931 |
| 2,159,772 | Schroedter | May 23, 1939 |
| 2,239,962 | Howard | Apr. 29, 1941 |
| 2,270,002 | Glick | Jan. 13, 1942 |
| 2,322,585 | Ojalvo | June 22, 1943 |